(12) United States Patent
Campbell et al.

(10) Patent No.: US 9,733,154 B2
(45) Date of Patent: Aug. 15, 2017

(54) SENSOR UNIT AND BEARING INCLUDING THE SAME

(71) Applicants: Andrew Campbell, East Kilbride (GB); Allan Thomson, Lanark (GB); Joseph Erskine, Falkirk (GB)

(72) Inventors: Andrew Campbell, East Kilbride (GB); Allan Thomson, Lanark (GB); Joseph Erskine, Falkirk (GB)

(73) Assignee: AKTIEBOLAGET SKF, Gothenburg (SE)

( * ) Notice: Subject to any disclaimer, the term of this patent is extended or adjusted under 35 U.S.C. 154(b) by 59 days.

(21) Appl. No.: 14/779,643

(22) PCT Filed: Mar. 27, 2013

(86) PCT No.: PCT/EP2013/056473
§ 371 (c)(1),
(2) Date: Sep. 24, 2015

(87) PCT Pub. No.: WO2014/154258
PCT Pub. Date: Oct. 2, 2014

(65) Prior Publication Data
US 2016/0047715 A1     Feb. 18, 2016

(51) Int. Cl.
*G01M 13/04*     (2006.01)
(52) U.S. Cl.
CPC .................. *G01M 13/045* (2013.01)
(58) Field of Classification Search
CPC .................................................. G01M 13/045
USPC .............................................................. 384/448
See application file for complete search history.

(56) References Cited

U.S. PATENT DOCUMENTS

| | | | | |
|---|---|---|---|---|
| 5,140,849 A | * | 8/1992 | Fujita | F16C 19/52 73/593 |
| 6,161,962 A | * | 12/2000 | French | B61F 15/20 384/448 |
| 6,695,483 B2 | * | 2/2004 | Sakatani | B61F 15/20 384/448 |
| 6,894,484 B2 | * | 5/2005 | Takizawa | B60T 8/171 310/155 |
| 7,320,257 B2 | * | 1/2008 | Takizawa | B60B 27/00 73/862.322 |
| 7,854,169 B2 | * | 12/2010 | Lou | F16C 19/186 73/599 |
| 2006/0070460 A1 | | 4/2006 | Knokke et al. | |
| 2011/0041611 A1 | * | 2/2011 | Hofer | G01H 1/003 73/579 |

FOREIGN PATENT DOCUMENTS

| | | |
|---|---|---|
| DE | 4304818 A1 | 8/1994 |
| DE | 102010008772 A1 | 8/2011 |
| EP | 1927855 A1 | 6/2008 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A sensor unit for a bearing including at least one inner ring and at least one outer ring, wherein the sensor unit is configured to detect at least one state variable of the bearing. The sensor unit is embedded in a recess of one of the inner ring or the outer ring.

13 Claims, 4 Drawing Sheets

SENSOR UNIT AND BEARING INCLUDING THE SAME

CROSS REFERENCE TO RELATED APPLICATION

This is a United States National Stage Application claiming the benefit of International Application Number PCT/EP2013/056473 filed on 27 Mar. 2013 (27.03.2013), which is incorporated herein by reference in its entirety.

FIELD OF THE INVENTION

The invention relates to a sensor unit for use with bearings, a bearing including such a sensor unit and a control unit for controlling or monitoring an apparatus including such a bearing.

BACKGROUND OF THE INVENTION

It is known to provide bearings with sensor units, which may be mounted in a housing or on the outer or inner ring of the bearing. Sensors which may be used are e.g. temperature sensors and rotation sensors.

Usually, sensor units are mounted on a surface of a bearing, e.g. on an axial side face of a bearing outer ring, wherein the sensors are arranged in a housing which is fixed to the surface of the bearing by adhesion or with screws.

This way of mounting the sensors has drawbacks, in particular in terms of robustness and precision of measurement. The position of the sensor housing on the surface is susceptible for damages due to unintended collisions with other parts or tools used during the assembly of the device provided with the bearing and the sensor may be fairly remote from the rolling elements such as rollers or balls the properties of which are measured.

SUMMARY OF THE INVENTION

The invention tries to overcome the above drawbacks of the prior art by providing a sensor unit, a bearing and a pertinent control unit.

The invention starts from a sensor unit for a bearing including at least one inner ring and at least one outer ring, wherein the sensor unit in configured to detect at least one state variable of the bearing. The state variables may include amplitudes of vibrations, acoustic emissions, temperature or strain values.

It is proposed that the sensor unit is configured to be embedded in a recess of the inner ring or of the outer ring of the bearing.

Due to the embedding, the sensors can be brought closer to the rolling elements such as rollers, tapered rollers, needles or balls of the bearing while at the same time protecting the sensor from collisions with tools or other parts of the device in which the bearing with the sensor unit is mounted.

Presently, the invention is mainly applicable to large-size bearings with diameters of several tenths of centimeters such as bearings for wind turbines, generators, ship propellers or the like. However, it is to be expected that the progress in miniaturization will make the invention applicable to smaller bearings as well. Special advantages of the invention may be achieved in the context of devices requiring a detailed remote monitoring, in particular wind turbines.

Preferably, the sensor unit includes multiple sensors in one single sensor housing. This may help to reduce costs of multiple housings and multiple recesses to be provided in the rings of the bearing and facilitates the assembly.

Further, it is proposed that the sensor unit is provided with a wireless transmitter for transmitting signals obtained by the sensor unit.

The machining of a suitable recess mating with the sensor unit is particularly simple and cost-saving when the sensor unit has a housing with a circular cross-section axially fitted into the recess.

Preferably, the housing of the sensor unit comprises at least one deeper portion and one shallower portion, wherein bolts for fixing the sensor unit or larger circuit boards or circuit elements may be provided in the shallower portion in a well-protected way and only the parts of the sensor which need to be as close as possible to the rolling elements of the bearing may be provided in the bottom portion of the deeper portion. The machining of a recess mating with a housing of this shape is particularly simple and cost-saving if the deeper portion and the shallower portion are formed in essentially cylindrical shapes of different diameters.

In a preferred embodiment, a bottom face of the sensor unit including at least one contact plate is configured to abut with a bottom surface of the deeper portion of the recess. This helps to bring the contact plate as close as possible to the rolling elements of the bearing.

Preferably, the sensor unit includes at least one strain sensor. It is in particular the strain measurement which is greatly improved in precision by bringing the sensor close to the rolling elements.

Further, the sensor unit may include at least one acoustic emission and/or vibration sensor.

In a preferred embodiment of the invention, it is proposed that the sensor unit includes a circlip to hold the sensor in the recess. The use of a circlip may help to avoid the use of screws and bolts, which affect the strain measurement in a detrimental way. The circlip may in particular engage with a circumferential notch provided in the inner surface of the recess.

Screws for closing the housing may be avoided by using a housing which is sealed with an adhesive bond, in particular with ultra-sonic welding.

Further, the invention proposes a bearing including an inner ring, an outer ring and a sensor unit as described above. A recess is provided in the outer ring or in the inner ring and the sensor unit is embedded in the recess. The recess may in particular comprise a deeper portion and a shallower portion mating with the deeper portion and the shallower portion of the sensor unit.

In embodiments using a circlip for fixing the sensor unit exclusively or in addition to screws or bolts, the recess may be provided with a circumferential notch for receiving the circlip for retaining the sensor unit in the recess. Alternatively, the circlip could be replaced with other elastical elements engaging with notches or holes in the side walls of the recess.

A further aspect of the invention relates to a control apparatus configured to receive data from the sensor unit and to generate status information or warning signals based on the received data.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
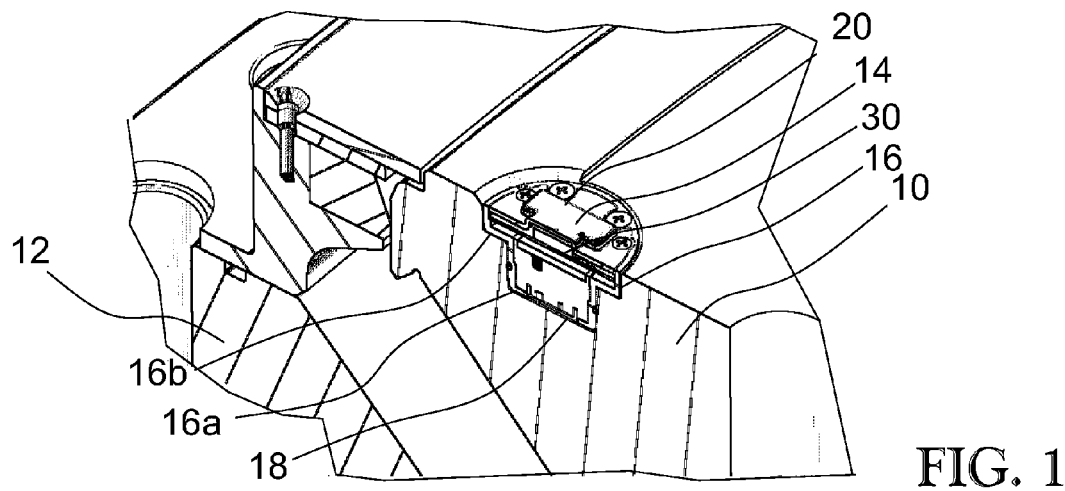
FIG. 1 is a schematic cross-sectional view of a bearing including a sensor unit according to the invention.

FIG. 1 shows a cross-sectional view of a sensor unit 14 embedded in an inner ring 10 of a taper roller bearing including an inner ring and an outer ring 12.

The sensor unit 14 is embedded in a recess 16 machined in the axially outer surface of the inner ring 10. The recess 16 comprises a deeper portion 16a and a shallower portion 16b, each being formed as concentrical bores with different diameters such that the shallower portion 16b forms a step.

The sensor unit 14 comprises a housing 18 formed with a T-shaped cross-section mating with the shape of the recess 16 and the housing 18 of the sensor element is fitted into the recess 16. A top-surface of the sensor unit 14 is flush with the axial side surface of the inner ring 10 and the sensor unit 14 is fixed in the recess 16 by means of screws 28 engaging with threaded bores (not shown) in the shallower portion 16b of the recess 16.

The sensor unit 14 comprises a circuit board 30 with a diameter larger than the diameter of the deeper portion 16a and is arranged in the transversal bar of the T-shape of the housing 18.

A wireless transmitter 20 including an antenna is arranged on the top side of the housing 18.

Figure 2:
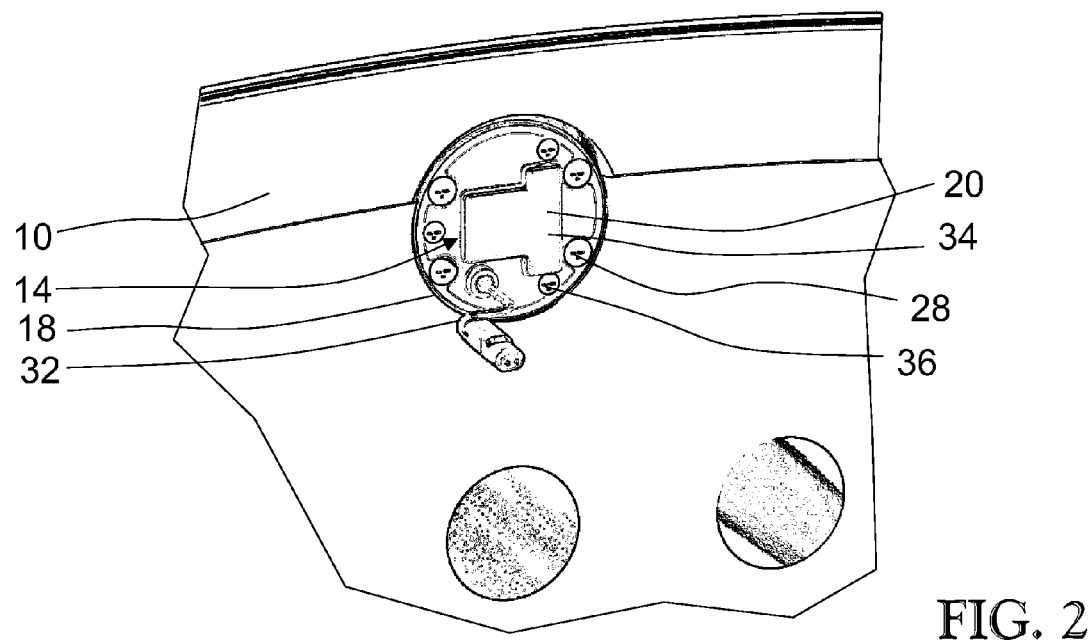
FIG. 2 is a view of the sensor unit as mounted in a recess in the inner ring of the bearing.

FIG. 2 illustrates a perspective view of the sensor unit 14 as mounted in the inner ring 10. A connector 32 with a wire is guided out of the housing 18 and enables to read out data or update firmware of a processor provided in the sensor unit 14 in a wired manner. It is to be noted that the wireless transmitter 20 or the connector 32 may be provided alternatively or in combination.

Figure 3:
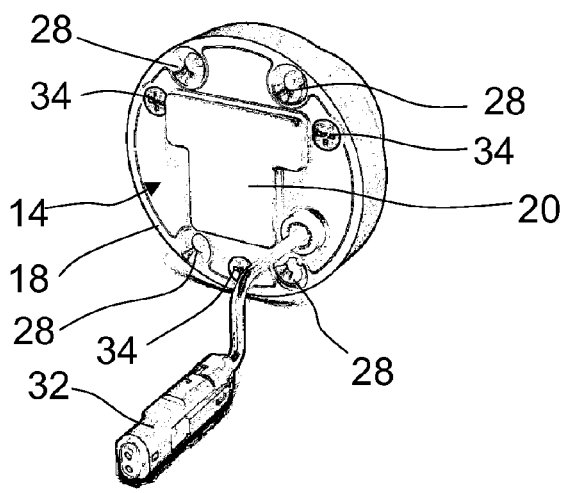
FIG. 3 illustrates the sensor unit according to the invention outside the recess.

FIG. 3 is a perspective view of the sensor unit 14 isolated from the recess 16. A plastic cover 34 of the housing 18 of the sensor unit 14 is fixed to a bottom part of the housing 18 by means of screws 36.

Figure 4:
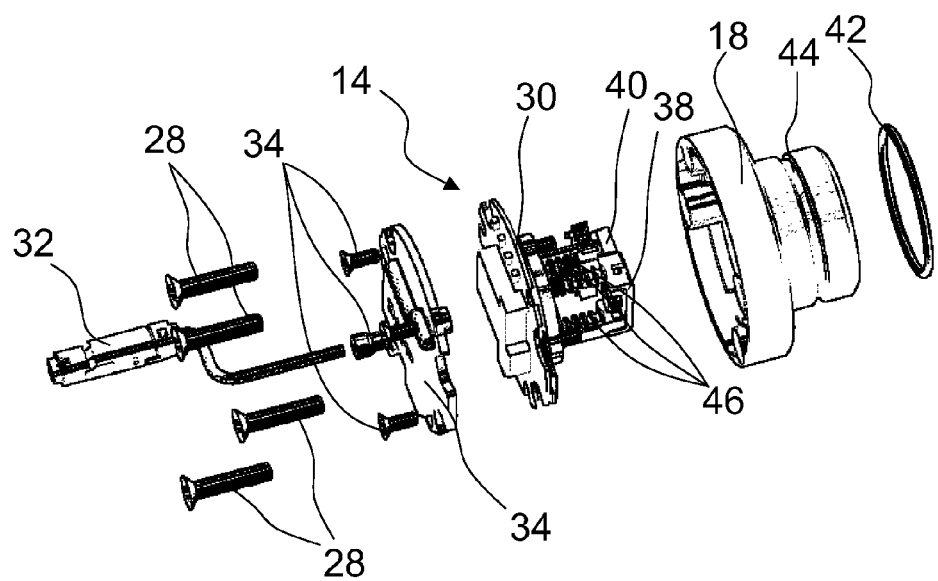
FIG. 4 is an exploded view of the sensor unit according to FIGS. 1-3.

FIG. 4 shows an exploded view of the sensor unit 14 according to the invention. The circuit board 30 is provided with a processor and a wireless transmitter units 20 and connected via flexible elements with a bottom part of the sensor unit 14 including the actual sensors and contact plates 38, 40 fitted into through holes (not shown) in the bottom surface of the lower part of the housing 18. An O-ring 42 is provided and engages with a circumferential notch 44 in the circumferential outer wall of the bottom part of the housing 18 and protects the contact plates 38, 40 from being contaminated by penetrating oil or other liquids. The contact plates 38, 40 are configured to be directly pressed against a bottom surface of the recess 16 by means of springs 46.

Figure 5:
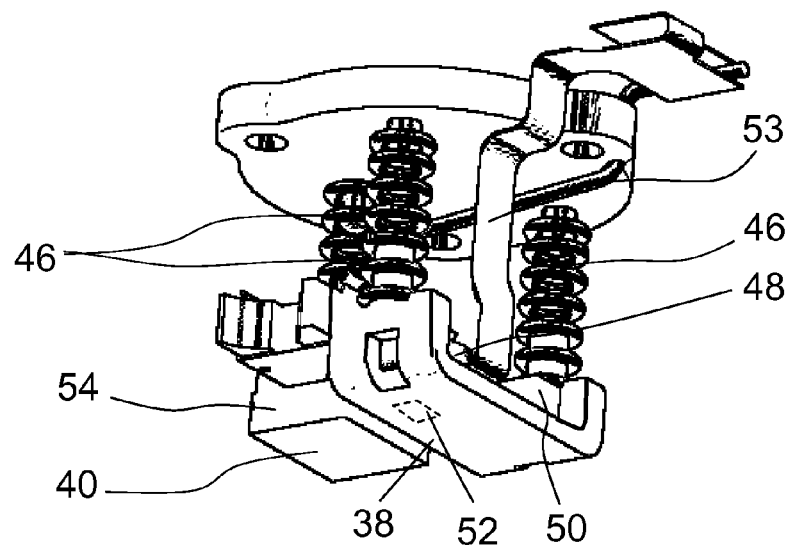
FIG. 5 is a view of a sensor arrangement arranged in a deeper portion of the recess.

FIG. 5 shows the bottom part of the sensor unit 14 including the contact plates 38, 40 in more detail. The first contact plate 38 is a metallic contact plate equipped with a vibration sensor 48, an acoustic emission sensor 50 and a temperature sensor 52. The second contact plate 40 is a contact plate of a strain sensor 54 formed as a friction strain gage.

The sensors 48-54 are mounted on flexible circuit boards 53 adhered to the actual contact plates 38, 40.

Figure 6:
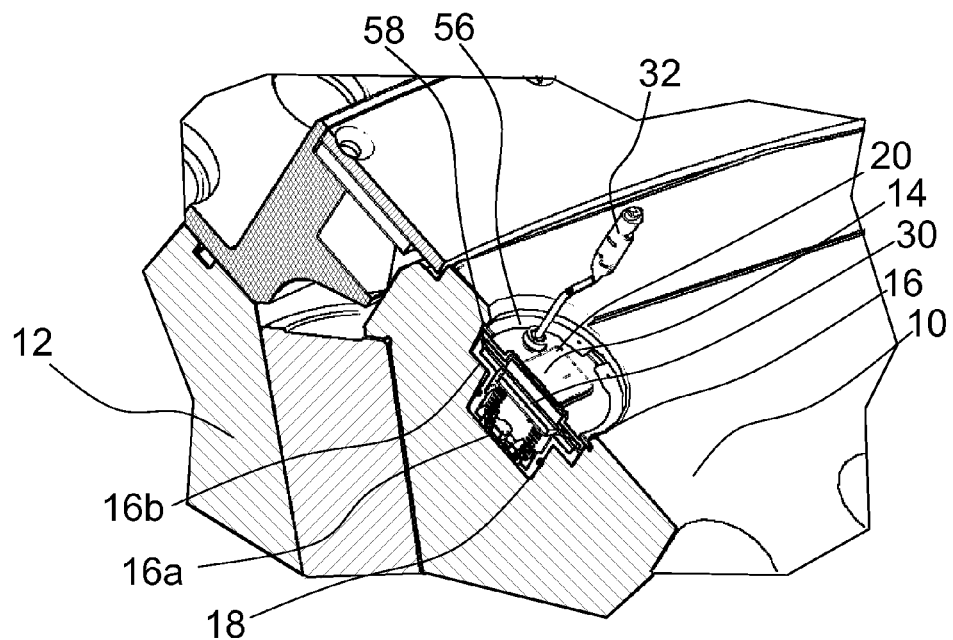
FIG. 6 is a sectional view of a sensor unit according to a second embodiment of the invention including a circlip.
Figure 7:
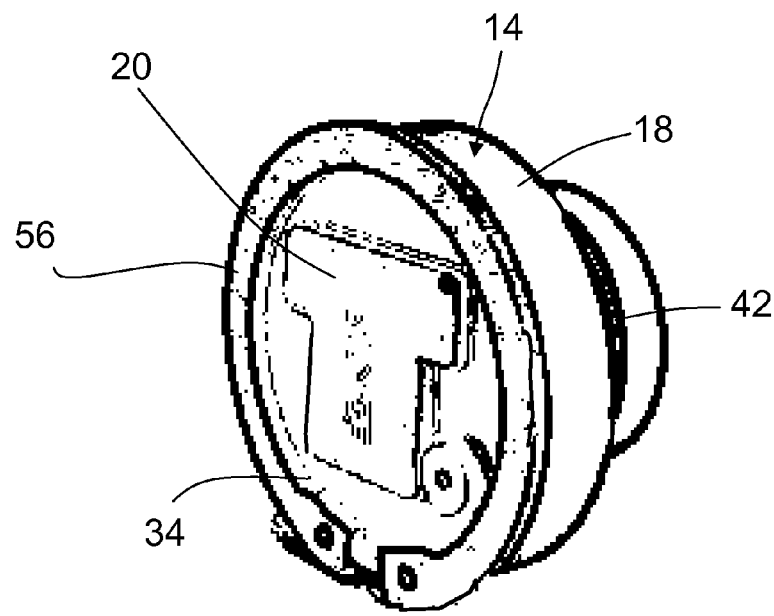
FIG. 7 shows the sensor unit of FIG. 6 outside from the recess.
Figure 8:
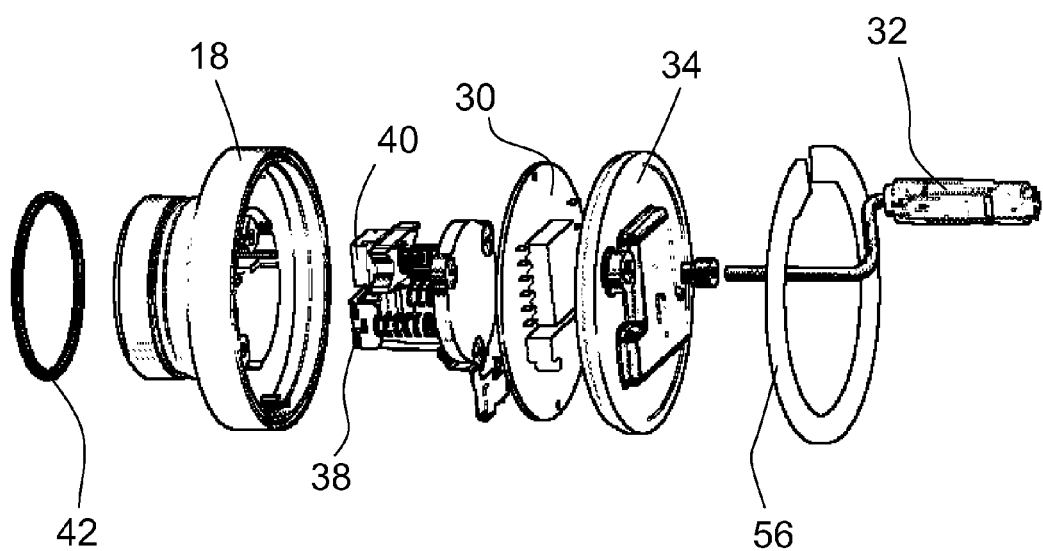
FIG. 8 shows an exploded view of the sensor unit according to FIGS. 6 and 7.

FIGS. 6 to 8 show a second embodiment of the invention. In the following description, the same reference numbers are used for features with similar functions. The description is limited to differences to the embodiment of FIGS. 1 to 5 and it is referred to the above description of FIGS. 1 to 5 for details of features which are unchanged.

The sensor unit 14 of the second embodiment is provided with a circlip 56 engaging with a notch 58 in the circumferential side surface of the shallower portion 16b of the recess 16. The notch 58 is deep enough to securely fix the sensor unit 14 in combination with the circlip 56 and its depth is chosen such that the outer diameter of the notch 58 is slightly smaller than the outer diameter of the circlip 56 in an unloaded configuration. The width of the notch 58 corresponds to the thickness of the circlip 56 such that the circlip 56 may be easily fitted into the notch while axial play of the circlip 56 is avoided. It is to be noted that the pressure of the springs 46 pushes the sensor unit 14 in the direction out of the housing 18 and this force is retained by the circlip 56.

FIG. 7 shows the sensor unit 14 in a perspective view. It should be noted that no screws are provided for closing the cover plate 34 of the housing 18 because the cover plate 34 is adhered to the housing 18 using ultra-sonic welding.

As illustrated in the exploded view of FIG. 8, no screws or bolts are provided for fixing the cover 34 to the base portion of the housing 18 or for fixing the sensor unit 14 in the recess 16. The functions of the screws 28, 36 are fulfilled by the adhesive bonding and the circlip 56, respectively.

The invention claimed is:

1. A sensor unit of a bearing unit comprising at least one inner ring and at least one outer ring, the sensor unit comprising:
    a sensor housing;
    multiple sensors including at least one strain sensor, each of the sensors being located in the sensor housing,
    wherein the sensor unit is configured to detect at least one state variable of the bearing,
    wherein the sensor unit is configured to be embedded in a recess of one of the inner ring or the outer ring.

2. The sensor unit according to claim 1, further comprising a wireless transmitter for transmitting signals obtained by the sensor unit.

3. The sensor unit according to claim 1, wherein the sensor housing comprises a circular cross-section axially fitted into the recess.

4. The sensor unit according to claim 1, wherein the sensor housing comprises at least one deeper portion of the recess and one shallower portion of the recess.

5. The sensor unit according to claim 4, wherein the deeper portion and the shallower portion are formed in essentially cylindrical shapes of different diameters.

6. The sensor unit according to claim 4, wherein a bottom face of the sensor unit includes at least one contact plate configured to abut with a bottom surface of the deeper portion.

7. The sensor unit according to claim 1, further includes at least one of an acoustic emission sensor and a vibration sensor.

8. The sensor unit according to claim 1, further includes a circlip to hold the sensor unit in the recess.

9. The sensor unit according to claim 1, wherein the sensor housing is sealed using an adhesive bond.

10. A bearing including:
an outer ring;
an inner ring;
a recess in one of the outer ring or the inner ring; and
a sensor unit comprising:
  a sensor housing; and
  multiple sensors comprising at least one strain sensor, each of the sensors being located in the sensor housing,
  wherein the sensor unit is configured to detect at least one state variable of the bearing,
  wherein the sensor unit is configured to be embedded in the recess of one of the inner ring or the outer ring.

11. The bearing according to claim 10, the recess further comprising:
a deeper portion; and
a shallower portion mating with a deeper portion of the sensor unit and a shallower portion of the sensor unit.

12. The bearing unit according to claim 10, wherein the recess is provided with a circumferential notch for receiving a circlip for fixing the sensor unit in the recess.

13. A system comprising:
an apparatus including a bearing;
a control unit that controls or monitors the apparatus,
wherein the bearing comprising:
  an outer ring;
  an inner ring;
  a recess in one of the outer ring or the inner ring; and
  a sensor unit comprising:
    a sensor housing; and
    multiple sensors comprising at least one strain sensor, each of the sensors being located in the sensor housing,
wherein the sensor unit is configured to detect at least one state variable of the bearing,
wherein the sensor unit is configured to be embedded in the recess of one of the inner ring or the outer ring;
wherein the control unit is configured to receive data from the sensor unit and to generate status information or warning signals based on the received data.

* * * * *